United States Patent [19]

Kiefer

[11] Patent Number: 4,870,034

[45] Date of Patent: Sep. 26, 1989

[54] BOROSILICATE GLASS

[75] Inventor: Werner Kiefer, Mainz, Fed. Rep. of Germany

[73] Assignee: Schott Glaswerke, Mainz, Fed. Rep. of Germany

[21] Appl. No.: 215,686

[22] Filed: Jul. 5, 1988

[30] Foreign Application Priority Data

Jul. 2, 1987 [DE] Fed. Rep. of Germany ....... 3722130

[51] Int. Cl.$^4$ ..................... C03C 3/091; C03C 3/093; C03C 3/118
[52] U.S. Cl. ........................................ 501/66; 501/59; 501/67; 252/478
[58] Field of Search ............................ 501/59, 66, 67; 252/478

[56] References Cited

U.S. PATENT DOCUMENTS

| | | | |
|---|---|---|---|
| 3,022,435 | 2/1962 | Atlee | 501/66 |
| 3,510,398 | 5/1970 | Wood | 501/66 |
| 3,984,252 | 10/1976 | Kiefer | 501/66 |
| 4,386,164 | 5/1983 | Moser | 501/66 |

*Primary Examiner*—Mark L. Bell
*Attorney, Agent, or Firm*—Millen, White & Zelano

[57] ABSTRACT

The invention relates to a borosilicate glass for the manufacture of laboratory glass, domestic glass, pharmaceutical container glass, lamp glass and X-ray tube glass. The glass has the following composition:

$SiO_2$: 74.5 to 76.5% by weight
$B_2O_3$: 10.0 to 12.0% by weight
$Al_2O_3$: 3.5 to 6.0% by weight
$Na_2O$: 6.0 to 8.0% by weight
CaO: 1.0 to 2.0% by weight
$ZrO_2$: 0 to 0.50% by weight
F: 0 to 1.0% by weight $As_2O_3$ and/or $Sb_2O_3$ and/or NaCl are used as refining agent.

10 Claims, No Drawings

BOROSILICATE GLASS

BACKGROUND OF THE INVENTION

The invention relates to new borosilicate glasses.

The technical literature discloses numerous borosilicate glasses having a high percentage of silicic acid (70–80%), a proportion of boric acid (7–13%), alkali-metal oxides ($Na_2O$, $K_2O$, 4–8%) and aluminium oxide (2–7%) and, if required, alkaline earth oxides (CaO, BaO, 0–5%). Characteristic features of these glasses are high chemical resistance (hydrolytic class 1, acid class 1), low thermal expansion and high temperature stressability.

For example, U.S. Pat. No. 4,386,164 describes a borosilicate glass of the following composition:

$SiO_2$: 70 to 74% by weight
$B_2O_3$: 9 to 13% by weight
$Al_2O_3$: 5 to 8% by weight
$Na_2O$: 5 to 8% by weight
$K_2O$: 0 to 4% by weight
CaO: 0 to 3% by weight
MgO: 0 to 1% by weight.

This glass has the required good chemical and temperature-resistance for use in the laboratory, but it is not suitable for other purposes, for example as domestic glass, lamp glass or X-ray tube glass.

SUMMARY OF THE INVENTION

The object of the invention is to make available a versatile glass which can be used as laboratory glass, domestic glass, pharmaceutical container glass, lamp glass and X-ray tube glass.

This problem necessitates meeting all the requirements specified by the various users of the glass.

Laboratory glass and domestic appliance glass, for example coffee pots and hot-water containers, are expected to have good chemical resistance and resistance to thermal shocks. These glasses must come in the first hydrolytic glass according to DIN 12111, the first acid class according to DIN 12116 and the second caustic solution class according to DIN 52322. The requirements in respect of resistance to thermal shocks depend on the area in which the glass is used. A well-known borosilicate glass, DURAN® glass 8330 made by Messrs. SCHOTT GLASWERKE, with a thermal expansion of $3.25 \times 10^{-6}$ $K^{-1}$, has a resistance to thermal shocks of 180 to 200 K. The metallic tungsten adjusted borosilicate glasses, such as, for example, SUPRAX® glass 8486 made by Messrs. SCHOTT GLASWERKE, with a thermal expansion of $4.1 \times 10^{-6}$ $K^{-1}$ have a resistance to thermal shocks of 140 to 150 K. A resistance of more than 110 K. to thermal shocks is sufficient for many laboratory glass containers and for most glasses used domestically. For borosilicate glasses this means a thermal expansion of $<5.2 \times 10^{-6}$ $K^{-1}$.

Glasses for pharmaceutical containers must also belong to the first hydrolytic class. It is desirable that they should also be in the first acid class, such as, for example, FIOLAX® clear glass 8412 made by Messrs. SCHOTT GLASWERKE. The dissolving out of BaO is particularly undesirable, since even small traces may lead to the precipitation of pharmaceutical products with sulphate groups. In the gasses according to the teaching of the cited U.S. Pat. No. 4,386,164 this problem is solved by replacing BaO by $K_2O$. The disadvantage of this replacement, however, is that the glasses satisfy only the requirements of the second acid class and, in addition, their thermal expansion rises.

Glasses for X-ray tubes are required to have a minimum X-ray absorption in order to obviate attentuation of the emergent X-rays. Also, the X-ray tube glass must be suitable for fusing in molybdenum and Ni-Fe-Co alloys (Kovar), such as, for example, KOVAR® glass 8245 made by Messrs. SCHOTT GLASWERKE. This means that the thermal expansion must be about $5 \times 10^{-6}$ $K^{-1}$.

The highest possible transformation temperature is desirable both for X-ray tube glasses and for lamp glasses. X-ray tube glasses have to be annealed at the highest possible temperatures, while ever-increasing light yields are required in the lamp industry, and this leads to heavier stressing of the lamps.

In view of the varying purposes for which they are intended, the following requirements apply to the properties of the new glass:

Hydrolytic resistance according to DIN 12111: class 1.
Acid resistance to DIN 12116: class 1.
Caustic solution resistance to DIN 52322: class 2.
Linear thermal expansion alpha (20°–300° C.): $4.3$–$5.0 \times 10^{-6}$ $K^{-1}$
Resistance to thermal shocks: $\geq 110$ K.
X-ray absorption $\mu$ at 0.6 Å: $\leq 5.3$ $cm^{-1}$
Transformation temperature Tg: 535° to 570° C.
Processing temperature $V_A$: 1140° to 1220° C.

According to the invention, the problem has been solved by a borosilicate glass which belongs to the first hydrolytic class according to DIN 12111, the first acid class according to DIN 12116 and the second caustic solution class according to DIN 52322, has a linear thermal expansion between 20° C. and 300° C. of 4.3 to $5.0 \times 10^{-6}$ $K^{-1}$, a transformation temperature of 535° to 570° C., a processing temperature of 1140° to 1220° C. and an X-ray absorption at 0.6 Å of $<5.20$ $cm^{-1}$, and the composition:

$SiO_2$: 74.5 to 76.5% by weight
$B_2O_3$: 10.0 to 12.0% by weight
$Al_2O_3$: 3.5 to 6.0% by weight
$Na_2O$: 6.0 to 8.0% by weight
CaO: 1.0 to 2.0% by weight
$ZrO_2$: 0 to 0.50% by weight
F: 0 to 1.0% by weight $As_2O_3$ and/or $Sb_2O_3$ and/or NaCl being used as refining agent.

A borosilicate glass preferred according to the invention has the following composition:

$SiO_2$ 75.25% by weight
$B_2O_3$: 11.00% by weight
$Al_2O_3$: 5.10% by weight
$Na_2O$: 7.00% by weight
CaO: 1.40% by weight
F: 0.25% by weight $As_2O_3$ and/or $Sb_2O_3$ being used as refining agent.

In order to obtain a borosilicate glass with a minimum X-ray absorption, the heavy elements, such as, for example, $K_2O$, BaO and ZnO, have been dispensed with.

Experiments showed that the required chemical stability can be obtained only with difficulty under these conditions. It was found that the $SiO_2$ content should not fall below 74.5% by weight, since otherwise the glass drops from acid class 1 to acid class 2. On the other hand, increasing the $SiO_2$ content beyond 76.5% by weight results in a sharp rise in the processing temperature.

The $B_2O_3$ content should not exceed 12% by weight, since otherwise the glass comes into the second acid class. If the $B_2O_3$ content falls below 10% by weight, exchange with $SiO_2$ results in the $V_A$ being increased to above 1200° C.

The $Al_2O_3$ content should not exceed 6% by weight, since otherwise the processing temperature rises too sharply. A fall in the $Al_2O_3$ content below 3.5% by weight must also be avoided, since separation of the mixture can otherwise readily occur.

The thermal expansion, the transformation temperature and hence the fusibility with molybdenum and Ni-Fe-Co alloys are very greatly governed by the $Na_2O$ and CaO content. The acid resistance and transformation temperature are increased by the incorporation of CaO. It has been found that the CaO content should not fall below 1% by weight, since otherwise it is not possible to comply with acid class 1. If the CaO content rises above 2% by weight, the glass mixture starts to separate and becomes cloudy.

Good hydrolytic stability and good acid resistance are obtained generally by utilizing the mixed alkali metal and mixed alkaline earth effects. It was therefore surprising to find that the glass can be kept in hydrolytic class 1 with an $Na_2O$ content of between 6 and 8% by weight without the addition of $K_2O$.

The addition of small quantities of $ZrO_2$ greatly improves the caustic solution resistance without the hydrolytic stability and acid resistance suffering. Since $ZrO_2$ greatly increases X-ray absorption and crystallization tendency, 0.50% by weight should not be exceeded.

The addition of fluorine serves to facilitate melting and reduce the $V_A$ temperature.

EXAMPLES

The following Table 1 gives compositions (in % by weight) and properties of known types of glass. The Table shows that none of the known glasses satisifes all the required properties.

Table 2 contains examples of the composition according to the invention. The glasses were melted in quartz crucibles at 1620° C. and refined at 1580° C.

The linear thermal expansion was measured between 20° C. and 300° C. The softening temperature $E_w$ is the temperature at which the glass has a viscosity of $10^{7.6}$ dPas.

The processing temperature $V_A$ is accordingly the temperature at which the glass has a viscosity of $10^4$ dPas. The X-ray absorption coefficient was calculated for 0.6 Å from synthesis and density.

The resistance to thermal shocks TWB was determined by the following formula:

$$TWB = \sigma \cdot (1-\mu)/(\alpha \cdot E),$$

where
 $\sigma$ = flexural tensile strength at 50 n/mm$^2$
 $\mu$ = Poisson's index at 0.2 and
 E = modulus of elasticity at $73 \times 10^3$ N/mm$^2$.

TABLE 1

|  | 8330 "DURAN" SCHOTT (1) | 8468 "SUPRAX" SCHOTT (2) | 8412 "FIOLAX" SCHOTT (3) | US-PS 4386164 (4) | 8245 "KOVAR" SCHOTT (5) |
|---|---|---|---|---|---|
| $SiO_2$ | 80.0 | 75.5 | 74.7 | 71.8 | 69.0 |
| $B_2O_3$ | 13.0 | 11.5 | 10.0 | 11.5 | 17.0 |
| $Al_2O_3$ | 2.5 | 4.0 | 5.0 | 6.8 | 5.0 |
| $Li_2O$ |  |  |  |  | 0.5 |
| $Na_2O$ | 3.5 | 4.0 | 6.5 | 6.4 | 7.0 |
| $K_2O$ | 1.0 | 1.0 |  | 2.7 | 0.5 |
| MgO |  | 0.5 |  | 0.2 |  |
| CaO |  | 1.0 | 1.5 | 0.5 |  |
| BaO |  | 2.5 | 2.0 |  |  |
| ZnO |  |  |  |  | 1.0 |
| F |  |  | 0.3 |  |  |
| Total | 100.0 | 100.0 | 100.0 | 99.9 | 100.0 |
| $\alpha_{20/300} \times 10^{-6} K^{-1}$ | 3.25 | 4.1 | 4.9 | 5.4 | 5.15 |
| Density g/cm$^3$ | 2.23 | 2.34 | 2.39 | 2.34 | 2.31 |
| Tg °C. | 530 | 550 | 560 |  | 505 |
| Cooling temp. °C. | 560 | 570 | 565 | 560 | 518 |
| $E_w$ °C. | 815 | 805 | 783 | 782 | 710 |
| $V_A$ °C. | 1270 | 1230 | 1160 | 1135 | 1040 |
| X-ray absorption 0.6 Å cm$^{-1}$ | 4.81 | 6.57 | 6.38 | 5.41 | 5.31 |
| Hydrol. resist. Class | 1 | 1 | 1 | 1 | ⅔ |
| Acid resist. Class | 1 | 1 | 1 | 2 | 3 |
| Caustic sol. res. Class | 2 | 2 | 2 | 2 | 3 |
| TWB K | 192 | 147 | 111 | 101 | 114 |
| Modulus of elasticity × 10$^3$ N/mm$^2$ | 63 | 66 | 73* | 73 | 68 |
| Poisson's index $\mu$ | 0.20 | 0.20 | 0.20 | 0.20* | 0.22 |

\* = Assumed values

TABLE 2

|  | 1 | 2 | 3 | 4 | 5 | 6* |
|---|---|---|---|---|---|---|
| $SiO_2$ | 74,70 | 75,25 | 75,50 | 75,20 | 76,20 | 76,15 |
| $B_2O_3$ | 11.00 | 10.50 | 11.00 | 12.00 | 11.00 | 11.00 |
| $Al_2O_3$ | 5.60 | 5.35 | 5.10 | 5.10 | 5.10 | 4.25 |
| $Na_2O$ | 7.00 | 7.00 | 7.00 | 6.00 | 6.00 | 7.80 |
| CaO | 1.40 | 1.50 | 1.40 | 1.40 | 1.40 | — |
| F | 0.30 | 0.20 | — | 0.30 | 0.30 | 0.30 |
| $ZrO_2$ | — | — | — | — | — | 0.50 |
| $\alpha_{20/300} \times 10^{-6} K^{-1}$ | 4.84 | 4.75 | 4.81 | 4.36 | 4.40 | 4.99 |
| Density g/cm$^3$ | 2.35 | 2.35 | 2.32 | 2.29 | 2.31 | 2.34 |
| Tg °C. | 542 | 549 | 569 | 540 | 553 | 546 |
| $E_w$ °C. |  |  |  | 805 | 801 | 779 |
| $V_A$ °C. | 1174 | 1163 | 1178 | 1197 | 1216 | 1146 |
| $\mu$ at 0,6 Å cm$^{-1}$ | 5.15 | 5.15 | 5.15 | 5.06 | 5.12 |  |
| TWB K | 114 | 116 | 114 | 126 | 125 | 110 |
| Hydrol. res. Class | 1 | 1 | 1 | 1 | 1 | 1 |
| Acid res. Class | 1 | 1 | 1 | 1 | 1 | 1 |

TABLE 2-continued

|  | 1 | 2 | 3 | 4 | 5 | 6* |
|---|---|---|---|---|---|---|
| Caust. sol. res. Class | 2 | 1 | 2 | 2 | 2 | 1 |

*Comparative Example

I claim:

1. A borosilicate glass, characterised in that it belongs to the first hydrolytic class according to DIN No. 12111, the first acid class according to DIN No. 12116 and the second caustic solution class according to DIN No. 52322, has a linear thermal expansion between 20° C. and 300° C. of 4.3 to $5.0 \times 10^{-6}$ $K^{-1}$, a transformation temperature of 535° to 570° C., a processing temperature of 1140° to 1220° C. and an X-ray absorption at 0.6 Å of $<5.20$ $cm^{-1}$, and the composition:
   $SiO_2$: 74.5 to 76.5% by weight
   $B_2O_3$: 10.0 to 12.0% by weight
   $Al_2O_3$: 3.5 to 6.0% by weight
   $Na_2O$: 6.0 to 8.0% by weight
   $CaO$: 1.0 to 2.0% by weight
   $ZrO_2$: 0 to 0.50% by weight
   F: 0 to 1.0% by weight.

2. A borosilicate glass according to claim 1, characterised in that it has the approximate composition:
   $SiO_2$: 75.25% by weight
   $B_2O_3$: 11.00% by weight
   $Al_2O_3$: 5.10% by weight
   $Na_2O$: 7.00% by weight
   $CaO$: 1.40% by weight
   F: 0.25% by weight.

3. In a glass article for containing pharmaceuticals the improvement comprising using the glass of claim 1.

4. In a glass article useful for laboratory glass, the improvement comprising using the glass of claim 1.

5. In a glass article useful for lamps, the improvement comprising using the glass of claim 1.

6. In a glass article for X-ray tubes, the improvement comprising using the glass of claim 1.

7. A glass according to claim 1, essentially free of $K_2O$ and $BaO$.

8. A glass according to claim 1, essentially free of $ZnO$.

9. A borosilicate glass, wherein the glass belongs to the first hydrolytic class according to DIN 12111, the first acid class according to DIN 12116 and the second caustic solution class according to DIN 52322, has a linear thermal expansion between 20° C. and 300° C. of 4.3 to $5.0 \times 10^{-6}$ $K^{-1}$, a transformation temperature of 535° to 570° C., a processing temperature of 1140° to 1220° C. and an X-ray absorption of 0.6 A of $<5.20$ $cm^{-1}$, and the composition:
   $SiO_2$: 74.5 to 76.5% by weight
   $B_2O_3$: 10.0 to 12.0% by weight
   $Al_2O_3$: 3.5 to 6.0% by weight
   $Na_2O$: 6.0 to 8.0% by weight
   $CaO$: 1.0 to 2.0% by weight
   $ZrO_2$: 0 to 0.50% by weight
   F: 0 to 1.0% by weight
   essentially free of $K_2O$ and $BaO$.

10. A borosilicate glass of claim 9, having the approximate composition:
    $SiO_2$: 75.25% by weight
    $B_2O_3$: 11.0% by weight
    $Al_2O_3$: 5.10% by weight
    $Na_2O$: 7.00% by weight
    $CaO$: 1.4% by weight
    F: 0.25% by weight.

* * * * *